(No Model.)
J. McBRIDE.
CHURN.
No. 446,263. Patented Feb. 10, 1891.
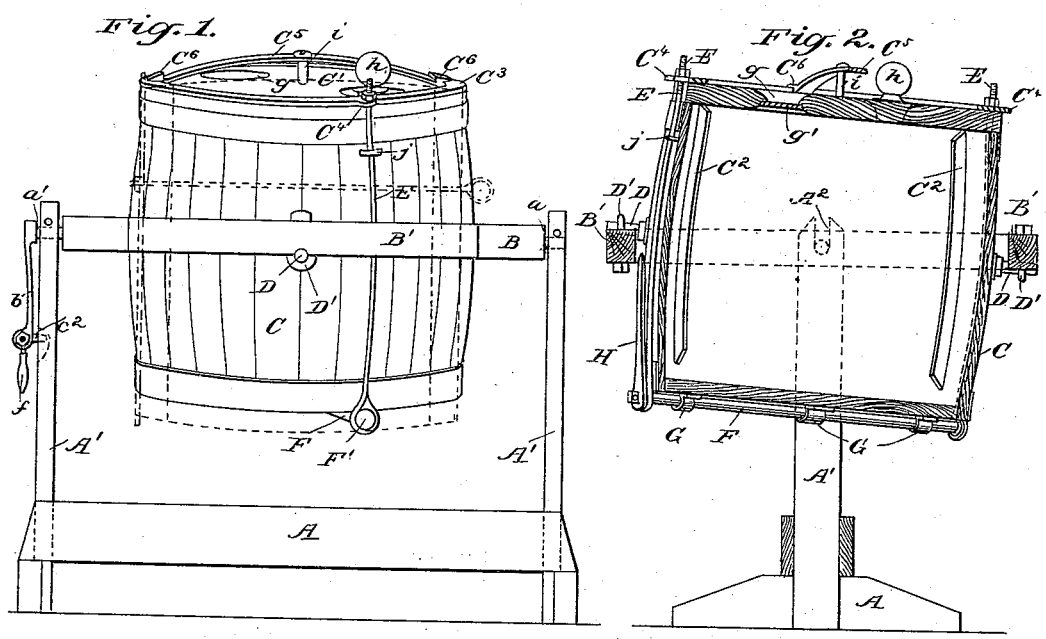
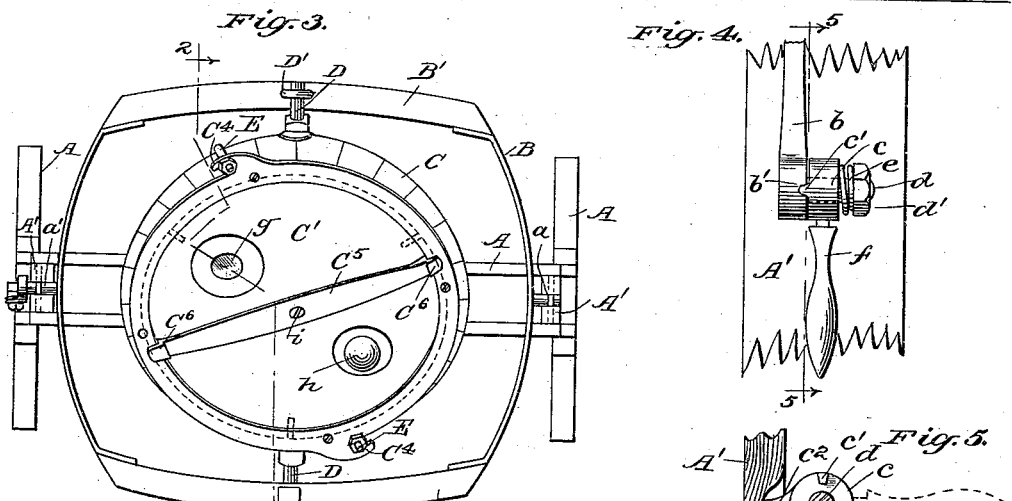
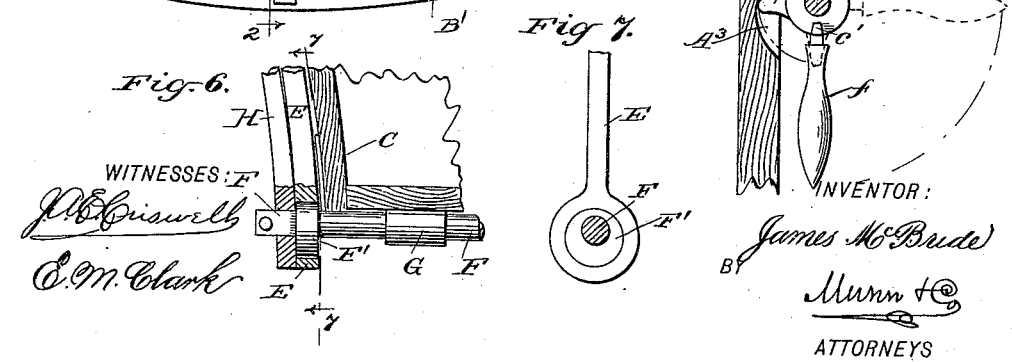
WITNESSES:
J. E. Criswell
E. M. Clark
INVENTOR:
James McBride
BY Munn & Co.
ATTORNEYS

UNITED STATES PATENT OFFICE.

JAMES McBRIDE, OF BAVINGTON, PENNSYLVANIA.

CHURN.

SPECIFICATION forming part of Letters Patent No. 446,263, dated February 10, 1891.

Application filed May 26, 1890. Serial No. 353,171. (No model.)

*To all whom it may concern:*

Be it known that I, JAMES MCBRIDE, of Bavington, in the county of Washington and State of Pennsylvania, have invented a new and Improved Churn, of which the following is a full, clear, and exact description.

My invention relates to improvements in churns, and specially to that class of churns known as "barrel-churns;" and the object of my invention is to provide a churn that may be easily operated, that may be easily uncovered in order to insert the cream or remove the butter, that will securely hold the cover in position when once adjusted, that may be quickly fixed in a vertical position, and that will quickly and thoroughly churn the cream which may be placed therein.

To this end my invention consists in certain features of construction and combinations of parts, which will be hereinafter fully described, and pointed out in the claims.

Reference is to be had to the accompanying drawings, forming a part of this specification, in which similar letters of reference indicate corresponding parts in all the figures.

Figure 1 is a side elevation of a churn embodying my invention. Fig. 2 is a vertical transverse section of the same on the line 2 2 of Fig. 3. Fig. 3 is a plan view of the same. Fig. 4 is a broken detailed view showing the crank-handle by means of which the churn is turned and by means of which it is fixed in a vertical position. Fig. 5 is a vertical section of the same on the line 5 5 of Fig. 4. Fig. 6 is a broken detailed sectional view showing the cam mechanism at the bottom of the churn for tightening the cover thereon; and Fig. 7 is a vertical section on the line 7 7 of Fig. 6, showing the cam and rod for tightening the cover.

A suitable frame A, adapted to rest firmly upon the floor, is provided at opposite ends with upwardly-extending standards $A'$, having slots $A^2$ at the top, in which is pivoted the hoop B, having flattened ends $B'$, said hoop being adapted to carry the churn and being pivoted in the standards $A'$ by the projecting trunnions $a$ and $a'$, which rest in the slots $A^2$ of the standards. The trunnion $a'$ projects through the standard $A'$, and fixed to the end thereof is a crank $b$, which is enlarged at its lower end and provided on opposite sides with recesses $b'$, and projecting from the enlarged portion of the crank is a short shaft $d$, having a suitable nut at the end thereof, upon which shaft is mounted a sleeve $c$, carrying the handle $f$ and having lugs $c'$ to engage the recesses $b'$ of the crank $b$, said lugs being normally held in engagement therewith by the spiral spring $e$, which encircles the shaft $d$ between the sleeve $e$ and the nut $d'$.

The sleeve $c$ is provided with a projecting arm $c^2$, adapted to engage the recess $A^3$ in the standard $A'$. When the handle $f$ is turned in a horizontal position, as shown by dotted lines in Fig. 5, it is adapted to be grasped, and the crank $b$ and the hoop B and churn pivoted therein thereby turned. When it is desired to fix the position of the crank $b$ and the churn connected therewith, the handle $f$ is turned downwardly, as shown in Figs. 4 and 5, the arm $c^2$ engages the recess $A^3$ of the standard $A'$, and the lugs $c'$ of the sleeve $c$ engage the recesses $b'$ of the crank, thereby holding the parts in position.

The churn is provided with a cylindrical or barrel-shaped body C, which is pivoted in the end portions $B'$ of the hoop B, the body being provided on opposite sides with trunnions D, which are centrally fixed thereon and which turn in the keepers $D'$, which are fixed to the end pieces $B'$ of the hoop, one of the said trunnions resting upon the upper side of one end piece and the opposite trunnion resting upon the lower side of the opposite end piece, so that as the churn is turned there will be an even pressure upon the hoop.

The body C is provided with a suitable lid or cover $C'$, which incloses the top, said lid having a perforation $g$ therein closed by a glass $g'$, through which the condition of the cream may be observed, and having a suitable air-vent closed by a stopper $h$. Within the body C of the churn are longitudinal ribs $C^2$, which project inwardly and which as the churn is turned will impede the current of the cream within, which will tend to move in a rotary direction and thereby hasten the separation of the butter.

The lid $C'$ is provided with an annular strip $C^3$, which extends around the upper edge of the same and which is provided on opposite sides with projecting slotted ears $C^4$, adapted to engage the binding-rods, as hereinafter described. The lid C' is also provided with a center brace C⁵, which is curved upwardly, as shown, and which at each end has suitable clamps C⁶ to engage the strip C³. A screw $i$ projects through the central portion of the brace C⁵ and into the lid C', so that by tightening the screw the pressure of the brace upon the outer edges of the lid may be increased, and as the binding-rods are attached to the ears C⁴, which are at right angles with the clamps C⁶, an even pressure upon the lid will thus be maintained. The binding-rods E extend vertically on opposite sides of the body C, projecting above and below the same, said rods having at their upper ends suitable nuts to engage the ears C⁴, and the rods are retained in position by the keepers $j$, which are attached to the sides of the body C.

The lower ends of the binding-rods E are enlarged, as shown, and each incloses a cam F' of the rod F, which extends across the bottom of the churn-body and is mounted in keepers G thereon. One end of the rod F projects beyond one of the rods E and is squared, as shown in Fig. 6, and attached to said squared end is a lever H, which when turned upwardly into alignment with the rod E will turn the thickened portion of the cam F' downwardly, and thus tighten the rods E, and which when turned downwardly will swing the thickened portion of the cam upwardly and loosen the rod, so that the lid C' may be easily removed. To remove the lid C' the rods E are loosened by the lever H, as shown, and the lid is then twisted slightly, so as to bring the ears C⁴ out of engagement with the rods E, and the lid may then be easily lifted from the body C.

It will be observed that the body C has a double motion, it being pivoted in the hoop B, so as to swing in one direction, and the hoop being pivoted in the standards A' at right angles to the other pivots, so that the churn may be given an axial motion by means of the crank connected therewith, and at the same time it will swing slightly in the opposite direction, so that the cream contained within the churn will be thoroughly churned and the butter will be very readily separated.

The body of the churn may be given an end-over-end motion, if desired; but the churn is usually operated as follows: The position of the body is fixed by the locking-crank and the lid fastened upon the body in the manner described. The body is then turned into a horizontal position, as indicated by dotted lines in Fig. 1, and the churn is rotated. The churn will turn very easily in this position, and the current of cream will travel at right angles to the ribs in the body. When the churning is finished, the body is again brought into a vertical position and secured by the locking-crank, the lid is removed, as described, and the butter taken out.

Having thus fully described my invention, I claim as new and desire to secure by Letters Patent—

1. A churn comprising a frame, a hoop pivoted in the frame and provided with a crank, a body pivoted in the hoop at right angles to the hoop-pivots, and a catch for locking the crank and hoop, substantially as described.

2. A churn consisting, essentially, of a frame, a hoop having flattened ends pivoted in the frame, a crank fixed to one of the hoop-pivots and provided with a vertically-swinging handle having an arm connected therewith adapted to engage a recess of the standards and fix the position of the hoop, and a cylindrical body pivoted in the hoop at right angles with the hoop-pivots, substantially as described.

3. In a churn, the combination, with the standards A', having a revoluble churn-body mounted therein, and one of the said standards having a recess A³, of the crank $b$, connected with the churn-body, as shown, and provided with recesses $b'$ and a short shaft $d$, having a suitable nut thereon, the spring-actuated sleeve $c$, having lugs $c'$ to engage the recesses $b'$ and an arm $c^2$ to engage the recess A³, and a suitable handle $f$, fixed to the sleeve, by means of which the same may be moved, substantially as described.

4. In a churn, the combination, with the body and a cover having projecting slotted ears, of a rod mounted transversely on the churn-bottom, said rod having one end provided with a lever and having cams, as shown, and binding-rods adapted to engage the ears and having perforated lower ends to inclose the cams, substantially as described.

5. The combination, with the churn-body, of a cover having upon its upper side an annular strip having laterally-extending ears, a spring-brace extending across the cover and pressing upon said strip, a rod mounted upon the churn-bottom, said rod having one end provided with a lever and having cams near the ends, as shown, and binding-rods adapted to engage the slotted ears and having perforated lower ends to inclose the cams, substantially as described.

JAMES McBRIDE.

Witnesses:
A. C. McCLURE,
J. B. TERRAN.